(12) United States Patent
Campbell et al.

(10) Patent No.: US 7,065,891 B2
(45) Date of Patent: Jun. 27, 2006

(54) ACCELEROMETER AUGMENTED PRECISION COMPASS

(75) Inventors: Ray F. Campbell, Newport Beach, CA (US); Joan D. Wada, Anaheim, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/904,227

(22) Filed: Oct. 29, 2004

(65) Prior Publication Data

US 2006/0090358 A1    May 4, 2006

(51) Int. Cl.
*G01C 19/38* (2006.01)

(52) U.S. Cl. ....................................................... 33/356
(58) Field of Classification Search ................ None
See application file for complete search history.

(56) References Cited

U.S. PATENT DOCUMENTS

| 2,998,946 | A | * | 9/1961 | Jude et al. ................... 244/183 |
| 3,260,485 | A | * | 7/1966 | Lerman et al. .............. 244/175 |
| 4,292,854 | A | * | 10/1981 | Liebing ...................... 73/5.34 |
| 4,507,737 | A | * | 3/1985 | LaSarge et al. ............. 701/220 |
| 6,785,975 | B1 | * | 9/2004 | Campbell et al. ............. 33/356 |
| 6,813,584 | B1 | * | 11/2004 | Zhou et al. .................. 702/151 |
| 2003/0218537 | A1 | * | 11/2003 | Hoch et al. .................. 340/524 |

* cited by examiner

*Primary Examiner*—Christopher W. Fulton

(57) ABSTRACT

A compass device includes a platform defining an xz-plane and an x-axis. A first accelerometer is coupled to the platform at an angle such that the first accelerometer is sensitive to movement of the first accelerometer in the xz-plane. The first accelerometer includes a first flexure plate generating a first accelerometer signal in response to movement of the first flexure plate. A second accelerometer is coupled to the platform at an angle such that the second accelerometer is sensitive to movement of the second accelerometer within the xz-plane. The second accelerometer includes a second flexure plate generating a second accelerometer signal in response to movement of the second flexure plate. A processor receives the first accelerometer signal and the second accelerometer signal and generates a platform control signal, thereby rotating the platform in response to an inequality between the first accelerometer signal and the second accelerometer signal.

20 Claims, 6 Drawing Sheets

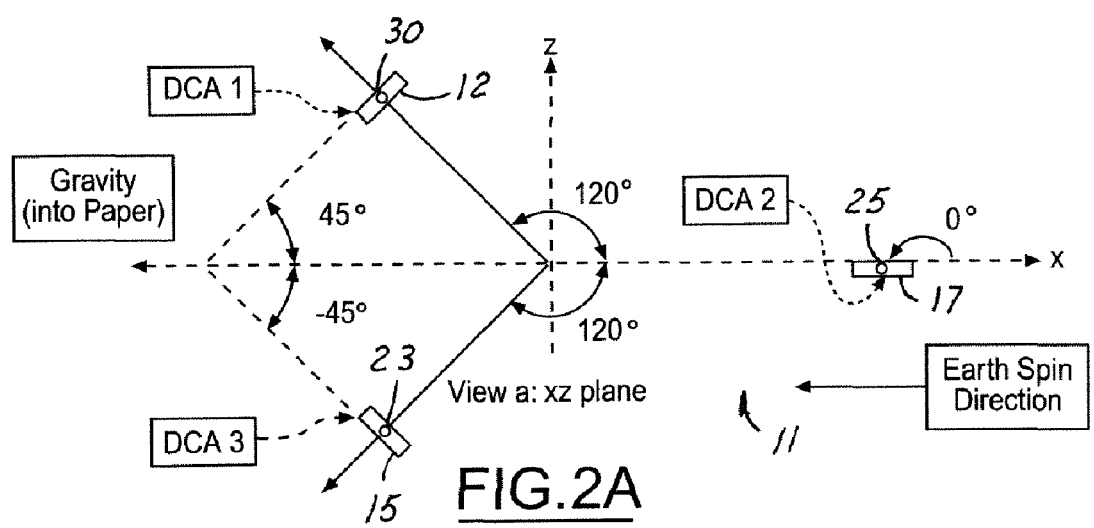

View c: xy plane

ACCELEROMETER AUGMENTED PRECISION COMPASS

TECHNICAL FIELD

The present invention relates generally to compass devices, and more particularly, to an accelerometer augmented precision compass.

It is well known that aerospace systems, such as missile systems, require internal control systems for the purpose of maintaining a particular level or attitude with respect to a fixed frame, such as the earth.

Currently, mechanical gyro-compass systems are used in aerospace systems to determine earth-spin direction and platform pointing directions. In other words, gyro-compasses find North by using an (electrically powered) fast spinning wheel and friction forces in order to exploit the rotation of the earth. Resultantly, gyro-compasses typically require large amounts of energy to maintain spinning motion.

Minimizing energy requirements is a constant goal for aerospace systems, therefore either eliminating or powering down mechanical gyro-compasses after direction is established would thereby dramatically decrease power consumption and enhanced reliability.

As was mentioned, compass devices are used in aerospace or in a portion of aircraft or spacecraft navigation or guidance systems. During operation of those system types, the operating environment temperature changes over a wide range. Consequently, object orientations must be measured and controlled with a high accuracy over a wide range of temperatures and temperature gradients. This is often a difficult and inefficient process.

The disadvantages associated with current compass systems have made it apparent that a new compass system is needed. The new compass system should minimize gyro-compass usage, substantially minimize temperature sensing requirements, and should also improve compass accuracy. The present invention is directed to these ends and enhanced reliability.

SUMMARY OF THE INVENTION

In accordance with one aspect of the present invention, a compass system for a missile system includes a platform coupled to an inertial measurement unit and defining an xz-plane, and an x-axis. A gyrocompass is co-mounted on the inertial measurement unit such that a system processor can align the x-axis to the earth's spin prior to turning control over to the following augmented compass implementation.

A first flexure plate dual capacitance accelerometer is coupled to the platform on a radial from the x-axis at an angle such that the first flexure plate dual capacitance accelerometer is sensitive to movement of the first flexure plate dual capacitance accelerometer in the xz-plane. The first flexure plate dual capacitance accelerometer includes a first flexure plate perpendicular to the xz-plane and generates a first flexure plate dual capacitance accelerometer signal in response to movement of the first flexure plate.

A second flexure plate dual capacitance accelerometer is coupled to the platform on a radial from the x-axis at an angle such that the second flexure plate dual capacitance accelerometer is sensitive to movement of the second flexure plate dual capacitance accelerometer in the xz-plane. The second flexure plate dual capacitance accelerometer includes a second flexure plate perpendicular to the xz-plane and generates a second flexure plate dual capacitance accelerometer signal in response to movement of the second flexure plate.

A third flexure plate dual capacitance accelerometer is coupled to the platform along the x-axis such that the third flexure plate dual capacitance accelerometer is sensitive to movement of the third accelerometer about the y-axis. The third flexure plate dual capacitance accelerometer includes a third flexure plate perpendicular to the xz-plane and generates a third flexure plate dual capacitance accelerometer signal in response to movement of the third flexure plate.

A processor is coupled to the first flexure plate dual capacitance accelerometer, the second flexure plate dual capacitance accelerometer, and the third flexure plate dual capacitance accelerometer. The processor receives the first flexure plate dual capacitance accelerometer signal, the second flexure plate dual capacitance accelerometer signal, and the third flexure plate dual capacitance accelerometer signal and generates a platform control signal to rotate the platform in response to an inequality between the first flexure plate dual capacitance accelerometer signal and the second flexure plate dual capacitance accelerometer signal. The processor generates a compass signal proportional to the deviation of the x-axis with respect to the known rotation vector of earth rotation in response to an equality of the first flexure plate dual capacitance accelerometer signal and the second flexure plate dual capacitance accelerometer signal and the third flexure plate dual capacitance accelerometer signal substantially zeroed.

In accordance with another aspect of the present invention, a method for operating a compass system includes generating a first accelerometer signal from a first flexure plate accelerometer, generating a second accelerometer signal from a second flexure plate accelerometer, rotating a platform clockwise when the first accelerometer signal is greater than the second accelerometer signal, rotating the platform counter-clockwise when the second accelerometer signal is greater than the first accelerometer signal, and generating a compass signal proportional to a deviation from an established earth rotation vector in response to equality of the first accelerometer signal and the second accelerometer signal.

One advantage of the present invention is that it generates a dynamic range and granularity sufficient for Inter-Continental Ballistic Missile (ICBM) usage. Additional advantages include that the compass device consumes less power than prior compass devices, while dramatically improving reliability and reduction in maintenance costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 2A illustrates an xz-plane view of a compass augmentation system in accordance with FIG. 1;

DETAILED DESCRIPTION OF THE INVENTION

The present invention is illustrated with respect to an accelerometer augmented precision compass, particularly suited to the aerospace field. The present invention is, however, applicable to various other uses that may require compasses, such as any system requiring position compass measurements under extreme conditions, as will be understood by one skilled in the art.

Figure 1:
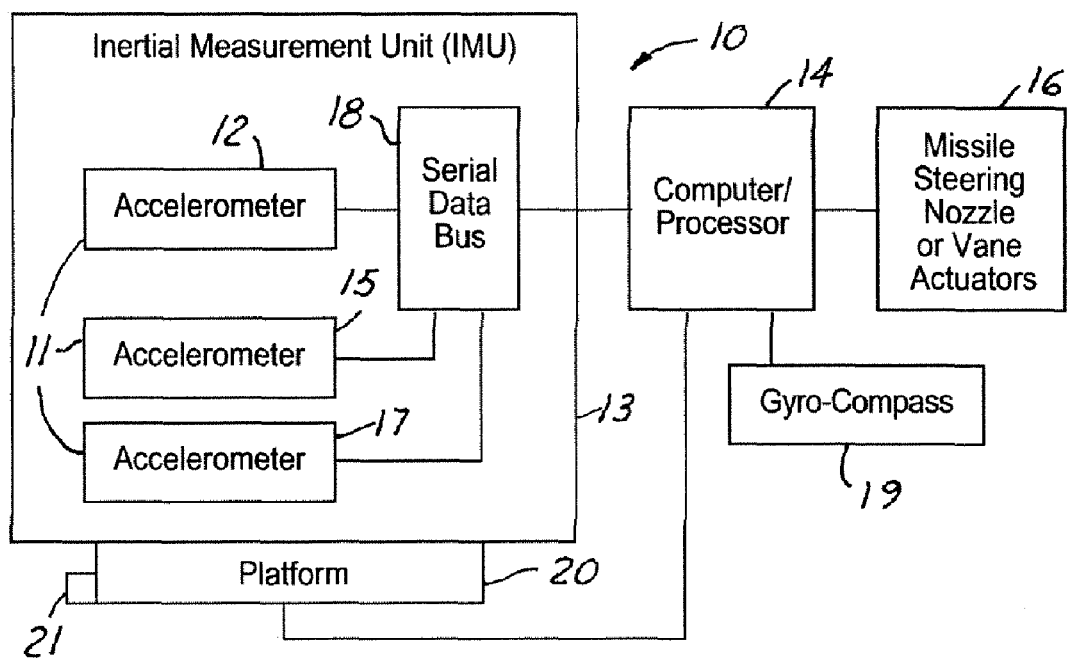
FIG. 1 illustrates an aeronautical system in accordance with one embodiment of the present invention.

Referring to FIG. 1, the missile or aerospace system 10, including an accelerometer augmented precision compass system 11 (AAPC) within an inertial measurement unit 13, is illustrated. The aerospace system 10 is merely an illustrative example of an accelerating object and not meant to be limiting. For example, the present accelerometer augmented precision compass system 11 could be implemented in any accelerating object to sense acceleration forces, including any type of vehicle or missile system, such as a Minuteman III missile system or a Scud missile system.

The illustrated aerospace system 10 includes an inertial measurement unit 13 including three accelerometers (first) 12, (second) 15, (third) 17 and a serial data bus 18. The aerospace system 10 further includes a computer/processor 14, a missile steering unit 16, a platform 20, a platform rotation measurement device 21, and a gyro-compass 19.

The computer 14 is coupled to the missile steering nozzle (or vane actuators) unit 16, the gyro-compass 19 (second compass system), and the platform 20.

The three accelerometers 12, 15, and 17, are coupled to the inertial platform 20 and the serial bus 18, which transfers information to a computer/processor 14.

Important to note is that alternate embodiments of the present invention have two or more accelerometers, the three illustrated accelerometers 12, 15, 17 are only one example of a possible arrangement of accelerometers for the compass system 11, and any number of accelerometers can be utilized. Each accelerometer is a single axis accelerometer that generates a robust wide dynamic range of performance. The accelerometers 12, 15, 17 will be discussed in further detail in reference to FIG. 3.

The platform 20, whereon the accelerometers 12, 15, 17 are mounted, includes the rotation measurement device 21. The rotation measurement device 21 is embodied as a synchro, a resolver, or a shaft angle reader. The platform 20 may be a single flat platform or gimbals and gimbal torque motors (yaw, pitch and roll motors) or any other compass mount known in the art. Platform control will be discussed later.

Figure 2B:
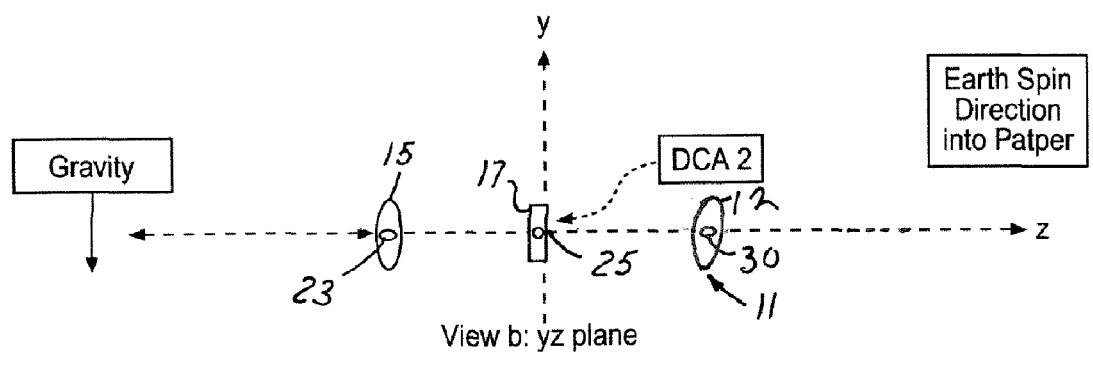
FIG. 2B illustrates an yz-plane view of the compass augmentation system of FIG. 2A.
Figure 2C:
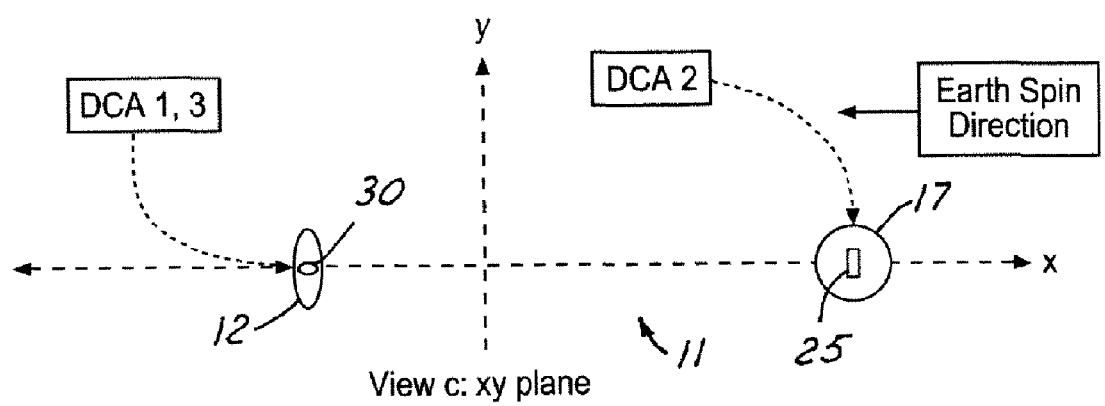
FIG. 2C illustrates a xy-plane view of the compass augmentation system of FIG. 2A.

Referring to FIGS. 2A, 2B, and 2C, a simplified implementation pictorial diagram of the AAPC 11 is illustrated. The present invention includes the compass system 11, the signal derivations and the general control mechanism for detecting planar orientation with respect to the earth. The three accelerometers 12, 15, 17 of the compass system 11 are illustrated in an xz-plane view in FIG. 2A, a yz-plane view in FIG. 2B, and an xy-plane view in FIG. 2C.

Figure 3:
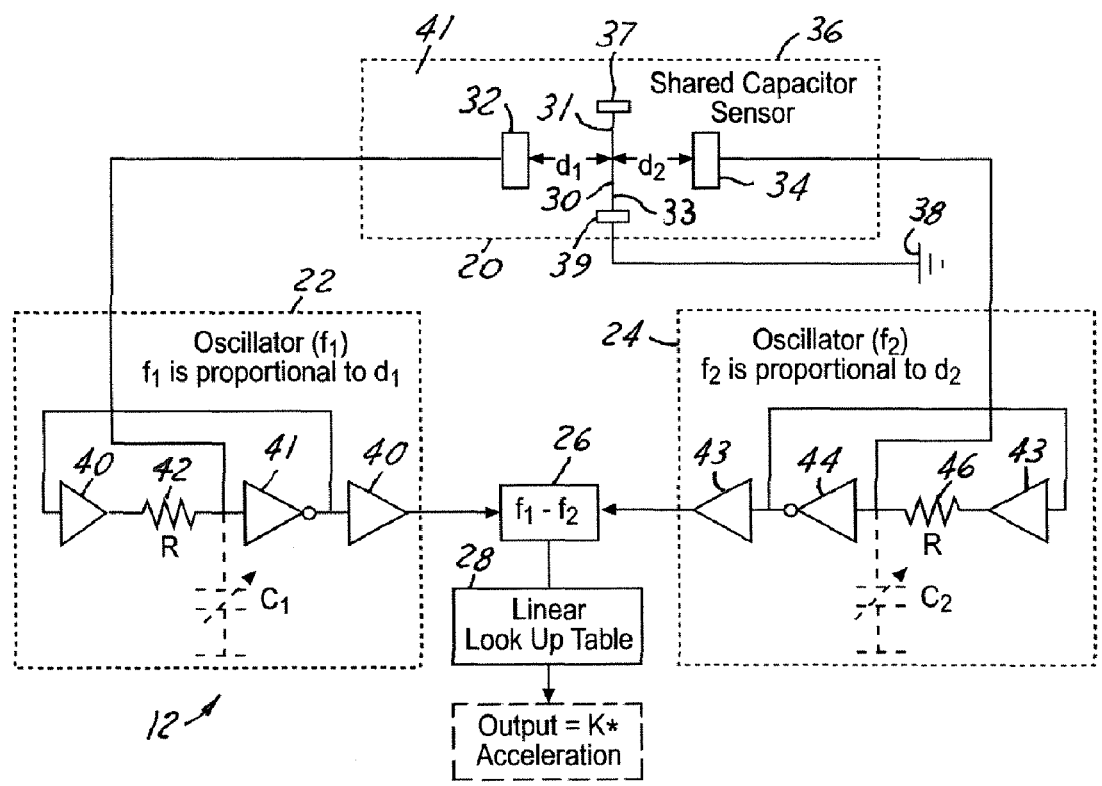
FIG. 3 illustrates a flexure plate dual capacitance accelerometer system in accordance with FIG. 1.

The accelerometers 12, 15, 17 of FIG. 1, configured per FIG. 3 are implemented in the AAPC 11. All accelerometer centers are mounted in a flat plane, e.g. the xz-plane, and maintained tangential to the earth or local level. For situations wherein this is not true, the deviations are calibrated during manufacture. The accelerometer centers are located at a distance r from the xyz origin. The accelerometer flexure plates 30, 23, 25 are located in near the accelerometer centers and will be discussed later. The system 10 also includes numerous variations and combinations of distances, whereby the accelerometers 12, 15, 17 are different known differences from the origin.

In the present embodiment, the flexure plates (flexure plate 30 for accelerometer 12, flexure plate 23 for accelerometer 15, and flexure plate 25 for accelerometer 17) of the accelerometers 12, 15, 17 are perpendicular to the xz-plane.

The center of accelerometer 12 is located on a radial at +120° from the x-axis with the flexure plate 30 rotated to make a 45° angle with the x-axis. The 45° and 120° angles are not an absolute requirement and are included as one embodiment of the present invention.

The center of accelerometer 15 is located on a radial of −120° from the x-axis with the flexure plate 23 rotated to make a −45° angle with the x-axis. The 45° and 120° angles are not an absolute requirement and are included as one embodiment of the present invention.

The center of accelerometer 17 and the flexure plate 25 therefore are located on the x-axis. Accelerometer 17 is not totally necessary, but will be used in practice to reduce settling time.

For this discussion, all distances (r) are assumed equal. This is not a requirement, and they may be both on either side of the origin, as long as they are separated by a known distance, and at a known distance from the origin.

The platform 20 includes xz-plane controls operated by the processor 14, which allow rotation of the platform 20 about the x-axis or z-axis. The compass system 11 also rotates about the y-axis in order to establish the direction of earth rotation so that these effects may be measured and calibrated out.

Initially, the compass system 11 monitors the gyrocompass to establish the exact rotation for each accelerometer 12, 15, 17 and rotates the mounting platform 20 in the xz-plane until the output of accelerometer 12,15 are at the 120 degrees from the x-axis and accelerometer 17 is on the x-axis defined by the gyrocompass. When the null conditions are satisfied, the illustrated accelerometer 12 and accelerometer 17 will read the force generated by deviations from the earth's rotation vector. The rotational control is then given to the AAPC.

Referring to FIG. 3, an example of a possible configuration for the accelerometer 12 is included as an illustrative example of the three accelerometers 12, 15, and 17. The accelerometer 12 is part of the inertial measurement unit 13, as was previously discussed. The accelerometer 12 includes a shared capacitor sensor 20, two oscillators 22, 24, a frequency subtraction device 26, and a Linear Lookup Table (LLT) or linearizer 28.

The shared capacitor sensor 20 includes a single flexure plate 30, two parallel fixed plates 32, 34, and a metal housing structure 36. The shared capacitor sensor 20 generates phase shift capacitance signals in response to acceleration and earth orientation of the aeronautical system 10, as will be discussed later.

The flexure plate 30 is positioned between the two fixed plates 32, 34 such that the first fixed 32 plate is a first distance ($d_1$) from a first side 31 and the second fixed plate 34 is a second distance ($d_2$) from a second side 33 of the flexure plate 30. The flexure plate 30 is affixed to the metal housing structure 36, which is coupled to a ground 38.

In the present embodiment, the flexure plate 30 is circular and coupled to a side 41 of the housing 36 at two edges 37, 39. However, numerous other shapes are included, as will be understood by one skilled in the art.

The flexure plate 30 is rigidly fixed to the metal housing structure 36 through almost any manner known in the art. Resultantly, all the system flexure is generated within the flexure plate 30. This generally increases reliability and robustness of the system 10. This, however, generates a non-linear output from the flexure plate 30, which will be discussed regarding the linear lookup table linearizer 28.

A gas or vacuum environment is enclosed within the sensor 20 through the metal housing structure 36 such that there is no interference with the movement of the flexure plate 30 other than the acceleration of the system 10 along a perpendicular axis. During acceleration, the flexure plate 30 flexes according to the reaction force of Newton's second law of motion, force=mass×acceleration (F=ma), causing the distance between the flexure plate 30 and the fixed plates 32, 34 to vary, thus creating the two variable capacitors, one on each side of the flexure plate 30.

The combination of the first fixed plate 32 and the flexure plate 30 forms a first parallel plate capacitor, and the combination of the second fixed plate 34 and the flexure plate 30 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $$C \cong (\epsilon_0 A)/d,$$

where $\epsilon_0$ is the permittivity constant, A is the area of a fixed plate 32 or 34 (if I is the length of one side and the cross section of the plate is square, then $A=I^2$) and d is the effective distance between the flexure plate 30 and one of the fixed plates 32, 34.

The first fixed plate 32 is coupled to the metal housing structure 36 and positioned a first distance ($d_1$) from the flexure plate 30. The first fixed plate 32 and the flexure plate 30 form a first capacitor whose operation is also governed by the equation $$C \cong (\epsilon_0 A)/d.$$

The first fixed plate 32 responds to movement of the flexure plate 30 when $d_1$ either increases or decreases, thereby generating a first phase shift capacitance signal.

The second fixed plate 34 is also coupled to the metal housing structure 36 and positioned a first distance ($d_1$) from the flexure plate 30. The second fixed plate 34 and the flexure plate 30 form a second capacitor whose operation is governed by the equation $$C \cong (\epsilon_0 A)/d.$$

The second fixed plate 34 responds to movement of the flexure plate 30 when $d_2$ either increases or decreases, thereby generating a second phase shift capacitance signal.

The distances ($d_1$ and $d_2$) between the flexure plate 30 and the fixed plates 32, 34 are a function of acceleration and are proportional or equal when the system 10 is at rest. Each fixed plate 32, 34 is connected to a respective oscillator 22, 24, which generates the phase shift capacitance necessary for predictable oscillation in the form of a frequency signal $F_1$ ($F_2$ for accelerometer 17 and $F_3$ for accelerometer 15).

The first fixed plate 32 is coupled to the first oscillator 22, and the second fixed plate 34 is coupled to the second oscillator 24. The two oscillators 22, 24 are coupled to a frequency subtraction device 26, and the frequency subtraction device 26 is coupled to the LLT 28, which is coupled to a processor 14 (missile operations processor). The processor 14 is coupled to an actuator 16, which is coupled to various system components 18, such as thrusters and attitude control devices.

The oscillators 22, 24 are ideally precision designs utilizing GaAs or similar material. The oscillators 22, 24 are also mounted on the metal housing structure 36 in the present embodiment.

The embodied first oscillator 22 includes components well known in the art. Although the embodied oscillator is a common oscillator type, one skilled in the art will realize that numerous other types of oscillators will also be adaptable for the present invention. The various components include, but are not limited to, two buffers, 40, an inverter 41, and at least one resistor 42. The first oscillator 22 receives the phase shift capacitance signal from the first fixed plate 32 and generates therefrom a frequency signal ($f_1$), which is proportional to $d_1$.

The second oscillator 24 receives the phase shift capacitance signal from the second fixed plate capacitor and generates therefrom a second frequency signal ($f_2$), which is proportional to $d_2$. The embodied oscillator 24 is similar to the first oscillator 22 and also includes a set of buffers 43, an inverter 44, and at least one resistor 46.

The frequencies ($f_1$ and $f_2$) are functions of the distances ($d_1$ and $d_2$) respectively. As the flexure plate 30 flexes, one capacitor increases and the other decreases, thereby causing one oscillator 22 to increase output frequency and the other oscillator 24 to decrease output frequency.

The frequency subtraction device 26 receives the oscillator signals ($f_1$ and $f_2$) and generates the difference thereof, i.e. $f_1 - f_2$. Important to note is that the polarities of both $f_1$ and $f_2$ are determined before this difference is calculated. An overall frequency signal is generated from the frequency subtraction device 26.

The linearizer 28 receives the overall frequency signal from the frequency subtraction device 26. The linearizer 28 compensates for both the nonlinear function generated from the frequency subtraction device 26 and any manufacturing anomalies, as will be understood by one skilled in the art. The linearizer value is established in manufacturing through taking large samples of performance curves, as will be understood by one skilled in the art. The linearizer output is a digital word whose magnitude is proportional to the acceleration of the system 10 in either direction along an axis perpendicular to the flexure plate 30, e.g. $F_1$ from accelerometer 12, $F_2$ from accelerometer 15, and $F_3$ from accelerometer 17.

Numerous alternate linearizers are also included in the present embodiment whereby a substantially linear function can be generated by compensating for nonlinear functions, for example, in the digital domain, a digital linearizer is included.

Statistical filtering of the linearized data somewhere significantly above the maximum flexure frequency also occurs in either the linearizer 28 or the processor 14 to reduce the overall noise impact on the system 10.

The processor 14 is embodied as a typical missile or airplane processor, as is familiar in the art. The processor 14 receives the output signals ($F_1$ from accelerometer 12, $F_2$ from accelerometer 15, and $F_3$ from accelerometer 17) and applies the compensation and calibration corrections derived from manufacturing and the earth rate calibration scheme, as will be discussed regarding FIG. 4. The processor 14 monitors the system 10 so that all conditions are met, and the processor 14 also issues a level acquired indicator, for launch time or utilization time, and this position is locked as the reference plane.

Coupled to the processor 14 are the missile steering nozzle (or vane actuators) unit 16, the gyro-compass 19, and the platform 20, which includes a rotation reading device 21, such as a synchro, a resolver, or a shaft angle reader.

The rotation reading device 21 reads a position of the platform 20 and generates an angular reference output signal therefrom, which the processor 14 uses to establish true north or any specific compass heading based on the established east-west alignment.

The actuator, here embodied as missile steering nozzle or vane actuators 16 receives processor signals and activates system components (e.g. object control devices) in response thereto. System components include for example, thrusters or attitude control devices.

Figure 4:
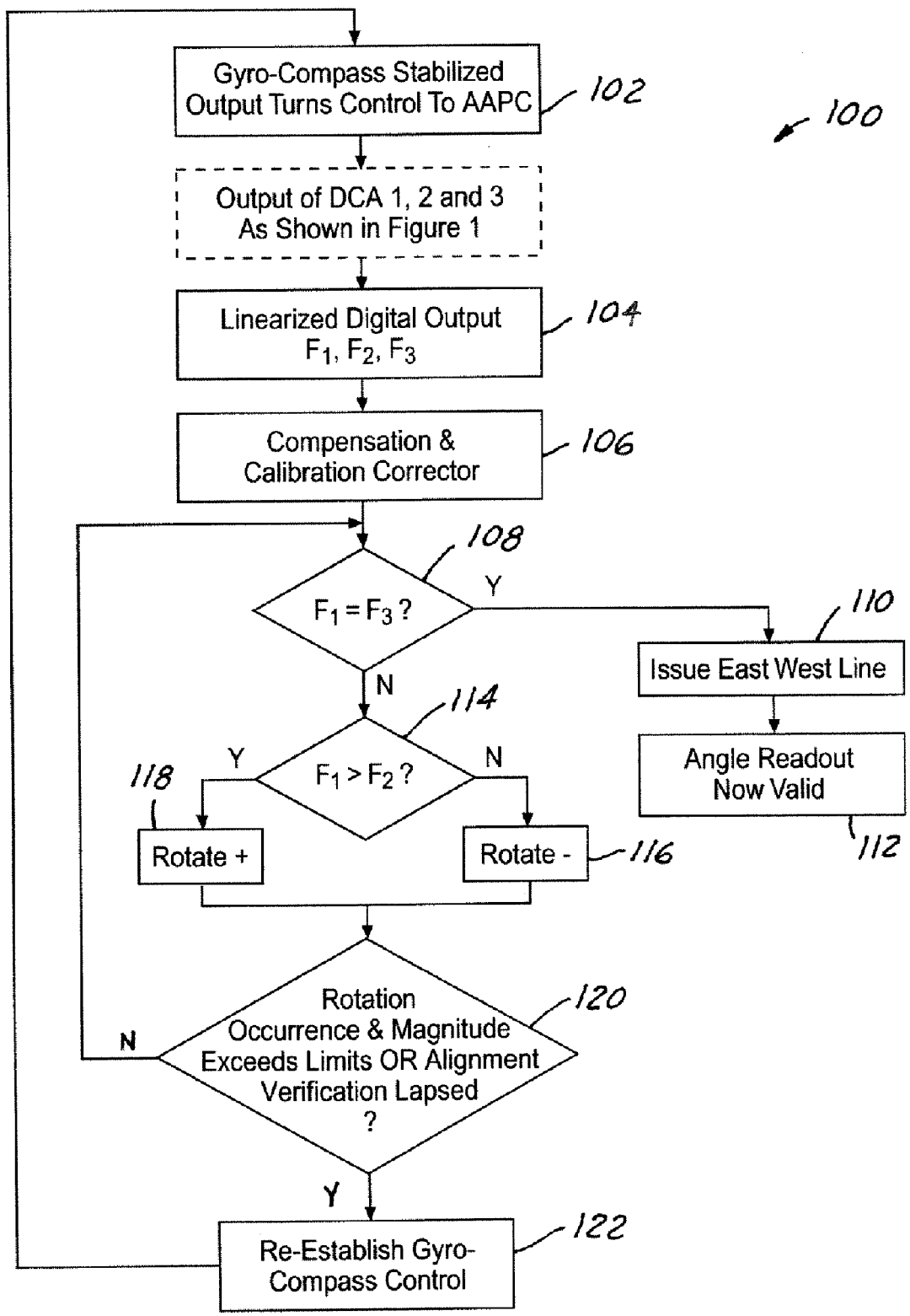
FIG. 4 illustrates a logic flow diagram of the aeronautical system of FIG. 1 in operation, in accordance with another embodiment of the present invention.

Referring to FIG. 4, a logic flow diagram 100 illustrating a method for operating an accelerometer augmented precision compass system 11 or an earth rate calibration scheme, in accordance with one embodiment of the present invention, is illustrated. Logic starts in operation block 102 where processor 14 switches compass control from the gyro-compass 19 to the accelerometer augmented precision compass system 11.

In operation block 104, the outputs from the accelerometers 12, 15, 17 are received and linearized, thereby generating three respective frequency signals, $F_1$ from accelerometer 12, $F_2$ from accelerometer 15, and $F_3$ from accelerometer 17.

In operation block 106, compensation and calibration correction logic within the processor 14 activates, whereby, in inquiry block 108 a check is made as to whether $F_1$ equals $F_2$. For a positive response, in operation block 110, east/west line acquisition is issued, and in operation block 112, the angle readout for the gyro-compass is now verified.

Otherwise, a check is made in inquiry block 114 as to whether $F_1$ is greater than $F_2$. For a negative response, the compass platform 20 is rotated at a negative angle to the present orientation.

Otherwise, in operation block 118, the compass platform 20 is rotated at a positive angle to the present orientation.

In response to operation blocks 116 and 118, inquiry block 120 makes a check to determine if excess motion has occurred beyond the limits of measurement or the time has elapsed requiring a gyrocompass verification. For a negative response, inquiry block 108 is activated. For a positive response, gyrocompass control is reestablished in operation block 122, and operation block 102 reactivates.

In operation, a method for operating a compass system includes receiving gyro-compass signals in the processor 14 for initial alignment or verification. The method further includes generating a first accelerometer signal from a first flexure plate accelerometer, generating a second accelerometer signal from a second flexure plate accelerometer, rotating a platform clockwise when the first accelerometer signal is greater than the second accelerometer signal, rotating the platform counter-clockwise when the second accelerometer signal is greater than the first accelerometer signal, and generating a compass signal proportional to the error between the x-axis and the earth rotation vector in response to equality of the first accelerometer signal and the second accelerometer signal. When there is an agreement between the compass signal and the gyro-compass signal, the gyro-compass may be powered down to conserve energy.

This process is performed when the missile is at rest, prior to launch. A calibration procedure will allow compensation for the offset introduced by the rotation of the earth.

This process is typically engaged when the missile is at rest, prior to launch, or in flight. A calibration procedure within the processor 14 allows compensation for the offset introduced by the rotation of the earth.

From the foregoing, it can be seen that there has been brought to the art a new and improved compass system. It is to be understood that the preceding description of the preferred embodiment is merely illustrative of some of the many specific embodiments that represent applications of the principles of the present invention. For example, a vehicle, such as an airplane, spacecraft, or automobile could include the present invention for directional control or orientation analysis. Numerous and other arrangements would be evident to those skilled in the art without departing from the scope of the invention as defined by the following claims.

What is claimed is:

1. A compass device comprising:
   a platform defining an xz-plane and an x-axis;
   a first accelerometer coupled to said platform at an angle such that said first accelerometer is sensitive to movement of said first accelerometer in said xz-plane, said first accelerometer comprising a first flexure plate generating a first accelerometer signal in response to movement of said first flexure plate;
   a second accelerometer coupled to said platform at an angle such that said second accelerometer is sensitive to movement of said second accelerometer within said xz-plane, said second accelerometer comprising a second flexure plate generating a second accelerometer signal in response to movement of said second flexure plate; and
   a processor receiving said first accelerometer signal and said second accelerometer signal, said processor generating a platform control signal thereby rotating said platform in response to an inequality between said first accelerometer signal and said second accelerometer signal as referenced to a co-mounted gyrocompass.

2. The device of claim 1 further comprising a third accelerometer coupled to said platform along said x-axis such that said third flexure plate dual capacitance accelerometer is sensitive to movement of said third accelerometer about said y-axis, said third flexure plate dual capacitance accelerometer comprising a third flexure plate perpendicular to said xz-plane and generating a third flexure plate dual capacitance accelerometer signal in response to movement of said third flexure plate.

3. The device of claim 2, wherein said processor further generates a compass signal proportional to a deviation from an earth rotation vector in response to an equality of said first accelerometer signal and said second accelerometer signal and said third accelerometer signal substantially zeroed.

4. The device of claim 2, wherein said first accelerometer, said second accelerometer, and said third accelerometer are equidistant from or a known variable distance from an intersection of an x-axis, a y-axis and a z-axis.

5. The device of claim 1, wherein said first accelerometer is orthogonal with respect to said second accelerometer.

6. The device of claim 1 further comprising an actuator activating a system component in response to said platform control signal.

7. The device of claim 6 wherein said system component comprises a thruster or an attitude control device.

8. The device of claim 1 further comprising a gyro-compass system generating gyro-compass signals, wherein said processor receives said gyro-compass signals and verifies accuracy thereof through comparison to said first accelerometer signal and said second accelerometer signal.

9. A method for operating a compass system comprising:
generating a first accelerometer signal from a first flexure plate accelerometer;
generating a second accelerometer signal from a second flexure plate accelerometer;
rotating a platform clockwise when said first accelerometer signal is greater than said second accelerometer signal;
rotating said platform counter-clockwise when said second accelerometer signal is greater than said first accelerometer signal; and
generating a compass signal proportional to a deviation from an established earth rotation vector in response to equality of said first accelerometer signal and said second accelerometer signal.

10. The method of claim 9 further comprising generating a third accelerometer signal from a third flexure plate accelerometer and applying said third accelerometer signal to the system thereby decreasing settling time for said compass signal.

11. The method of claim 9 further comprising calibrating the compass system in relation to a rotation of the earth by rotating the system about a y-axis;
measuring effects of said rotation; and
calibrating said effects out of future compass calculations.

12. The method of claim 9 further comprising generating a level acquired indicator signal, and locking said level acquired indicator signal as a reference plane.

13. The method of claim 12 further comprising activating compensation and calibration correction logic within said processor in response to a stabilized output from a second compass system.

14. The method of claim 13 further comprising powering down said second compass system in response to agreement of said compass signal and said stabilized output.

15. A compass system for a missile system comprising:
an inertial measurement unit;
a platform coupled to said inertial measurement unit and defining an xz-plane, and an x-axis;
a first flexure plate dual capacitance accelerometer coupled to said platform on a radial from said x-axis at an angle such that said first flexure plate dual capacitance accelerometer is sensitive to movement of said first flexure plate dual capacitance accelerometer in said xz-plane, said first flexure plate dual capacitance accelerometer comprising a first flexure plate perpendicular to said xz-plane and generating a first flexure plate dual capacitance accelerometer signal in response to movement of said first flexure plate;
a second flexure plate dual capacitance accelerometer coupled to said platform on a radial from said x-axis at an angle such that said second flexure plate dual capacitance accelerometer is sensitive to movement of said second flexure plate dual capacitance accelerometer in said xz-plane, said second flexure plate dual capacitance accelerometer comprising a second flexure plate perpendicular to said xz-plane and generating a second flexure plate dual capacitance accelerometer signal in response to movement of said second flexure plate;
a third flexure plate dual capacitance accelerometer coupled to said platform along said x-axis such that said third flexure plate dual capacitance accelerometer is sensitive to movement of said third accelerometer about said y-axis, said third flexure plate dual capacitance accelerometer comprising a third flexure plate perpendicular to said xz-plane and generating a third flexure plate dual capacitance accelerometer signal in response to movement of said third flexure plate; and
a processor coupled to said first flexure plate dual capacitance accelerometer, said second flexure plate dual capacitance accelerometer, and said third flexure plate dual capacitance accelerometer,
said processor receiving said first flexure plate dual capacitance accelerometer signal, said second flexure plate dual capacitance accelerometer signal, and said third flexure plate dual capacitance accelerometer signal and generating a platform control signal to rotate said platform in response to an inequality between said first flexure plate dual capacitance accelerometer signal and said second flexure plate dual capacitance accelerometer signal,
said processor generating a compass signal proportional to a deviation from an earth rotation vector in response to an equality of said first flexure plate dual capacitance accelerometer signal and said second flexure plate dual capacitance accelerometer signal and said third flexure plate dual capacitance accelerometer signal substantially zeroed.

16. The system of claim 15, further comprising a synchro, a resolver, or a shaft angle reader reading a position of said platform and generating an angular reference output signal therefrom.

17. The system of claim 16, wherein said processor receives said angular reference signal and generates a compass heading signal therefrom.

18. The system of claim 16, wherein said processor is calibrating the compass system in relation to the earth by generating a rotation signal to rotate the compass system about an x-axis or a z-axis, said processor further generating a signal to rotate the compass system about a y-axis in response to a rotation of the earth, said processor further measuring effects of said rotation about said x-axis, said y-axis, or said z-axis, said processor still further calibrating said effects out of future compass calculations.

19. The system of claim 18, wherein said processor is further generating a location indicator signal in response to an equality between said first flexure plate dual capacitance accelerometer and said second flexure plate dual capacitance accelerometer, said processor further locking said location indicator signal as a reference plane.

20. The system of claim 15 further comprising a gyro-compass system generating gyro-compass signals, wherein said processor receives said gyro-compass signals and verifies accuracy thereof through comparison to said compass signal.

* * * * *